United States Patent [19]

Heitner

[11] Patent Number: 4,605,717

[45] Date of Patent: Aug. 12, 1986

[54] PREPARATION OF ACRYLIC POLYMER SHEETS USING A TERNARY PEROXIDE INITIATOR SYSTEM

[75] Inventor: Barry J. Heitner, Bartlett, Tenn.

[73] Assignee: E. I. du Pont de Nemours and Company, Wilmington, Del.

[21] Appl. No.: 747,416

[22] Filed: Jun. 21, 1985

[51] Int. Cl.[4] .......................... C08F 4/38; C08F 20/14
[52] U.S. Cl. .................................. 526/228; 525/263; 526/309; 526/323.2; 526/328.5; 526/329.2; 526/329.3; 526/329.5; 526/329.7
[58] Field of Search ............... 525/263; 526/228, 309, 526/323.2, 328.5, 329.2, 329.3, 329.5, 329.7

[56] References Cited

U.S. PATENT DOCUMENTS

| 3,113,114 | 12/1963 | Maginn et al. | 526/228 |
| 3,726,846 | 4/1973 | Squire et al. | 526/228 |
| 3,726,848 | 4/1973 | Squire et al. | 526/228 |
| 3,763,128 | 10/1973 | Lewis et al. | 526/329.7 |
| 4,110,526 | 8/1978 | Hamada et al. | 526/329.7 |
| 4,152,506 | 5/1979 | Novak | 526/329.7 |
| 4,197,215 | 4/1980 | Dudinyak | 526/329.7 |
| 4,214,064 | 7/1980 | Kanazawa | 526/329.7 |
| 4,328,329 | 5/1982 | Novak | 526/329.7 |

Primary Examiner—Harry Wong, Jr.
Attorney, Agent, or Firm—Donald W. Huntley

[57] ABSTRACT

A process for producing acrylic polymers at a high rate which have high thermal stability, are free of defects and have a low level of unreacted monomer by polymerization of a methyl methacrylate syrup in the presence of a mixture of three peroxide initiators.

8 Claims, No Drawings

PREPARATION OF ACRYLIC POLYMER SHEETS USING A TERNARY PEROXIDE INITIATOR SYSTEM

BACKGROUND OF THE INVENTION

The manufacture of acrylic polymers such as cast poly(methyl methacrylate) has increased substantially due to growing demand. With increasing use of acrylic polymers, much effort has been made to find polymerization systems which will improve production rates without compromising the quality of the finished product.

Acrylic polymers are generally prepared by casting a blend of methyl methacrylate monomer containing some polymer, commonly referred to as prepolymer or prepoly syrup. A variety of initiators and initiator systems have been suggested and used to increase the production rate of the resulting cast poly(methyl methacrylate) sheet. Many have been combinations of a variety of peroxide and azo initiators. Dual initiator systems of different peroxide/peroxide, peroxide/azo, and azo/azo initiators have been suggested, including those found in Novak, U.S. Pat. No. 4,328,329 issued May 4, 1982. Novak was concerned with finding a combination of initiators which would provide fast polymerization with low residual monomer. To do so, he selected a dual initiator system consisting of an active peroxide and less active azo. The active peroxide (t-butyl or t-pentyl peroxyneodecanoate) insured fast polymerization. The less active azo(2,2'-azobis(isobutyronitrile)) reduced the residual monomer to acceptable levels. Together, these initiators provided a combination which seemed to work well.

Other initiator systems previously used include that described by D. W. Wood in Plastics Engineering, May 1975, pp. 51-53. Wood discloses the combined use of t-butyl peroxyneodecanoate and decanoyl peroxide. However, Novak found that a peroxide/azo initiator system was superior to the dual peroxide system.

It has been found that acrylic sheet produced in accordance with the Novak patent, while generally of excellent quality, was prone to bubble formation when heated. This problem was particularly severe when the acrylic sheet was thermoformed at temperatures at about or above 200° C. since gas solubility decreases with increasing temperature. The bubble formation was aggravated by nitrogen gas which is emitted as the azo initiator decomposes. The nitrogen is less soluble in acrylic sheet than such gases as carbon dioxide and will cause bubbles to form at lower concentrations. This problem is less likely to occur with peroxides which emit carbon dioxide when they decompose. The carbon dioxide is more soluble than nitrogen and is less likely to cause bubbling either during polymerization or subsequently during thermoforming of the acrylic sheet. However, the decomposition properties of the peroxides need to be selected carefully since too much carbon dioxide can also cause bubbling and adversely affect thermal stability.

Continuing effort has been directed to providing an initiator system which will result in a fast production rate and produce sheet free of cavities or other defects, relatively free of residual monomer and which has high thermal stability so that it can be subsequently thermoformed at temperatures at or above 200° C. without bubble formation.

SUMMARY OF THE INVENTION

The present invention achieves all the aforestated goals by employing, in the polymerization of methacrylate syrup, a mixture of three types of peroxide initiators with half-life and decomposition properties matched carefully to the temperature conditions encountered during polymerization of the syrup.

Specifically, the present invention provides, in a process for preparing acrylic polymer selected from the group consisting of methyl methacrylate homopolymer and copolymers of methyl methacrylate with $\alpha,\beta$-ethylenically unsaturated compounds, which process comprises polymerizing a syrup containing about 10-40% by weight of methyl methacrylate homopolymer or copolymer in monomeric acrylate or methacrylate in the presence of an initiator, the improvement wherein the initiator comprises (a) about from 0.3 to 16 moles per 1 million grams of syrup of a first peroxide initiator which has a half-life at 85° C. of about from 2 to 8 minutes and which emits a maximum of 1 mole of carbon dioxide per 2 moles of free radical generated;

(b) about from 0.3 to 16.0 moles per 1 million grams of syrup of a second peroxide initiator which has a half-life at 85° C. of about from 10 to 25 minutes and which emits a maximum of 1 mole of carbon dioxide per 2 moles of free radicals generated; and (c) about from 0.1 to 6.0 moles per 1 million grams of syrup of a third peroxide initiator which has a half-life at 110° C. of about from 1.0 to 3.5 minutes and which emits a maximum of 1 mole of carbon dioxide for each mole of free radical generated; the process further comprising first heating the mixture of the syrup and the initiator solution to a temperature of about from 45° C. to 90° C. for about from 10 to 100 minutes wherein about 90% conversion to polymer is achieved, and subsequently heating the mixture to a temperature of about from 110° C. to 140° C. wherein the conversion to polymer increases to at least about 97.5%.

DETAILED DESCRIPTION OF THE INVENTION

The present invention uses three peroxide initiators to produce acrylic sheet at a high production rate that has good thermal stability, is bubble free and is relatively free of residual monomer and defects such as cavities. Except for the initiators and concentrations used, the polymerization of the methyl methacrylate (MMA) syrup is generally the same as that disclosed in the Novak, U.S. Pat. No. 4,328,329, hereby incorporated by reference.

The preparation of the prepolymer or prepoly syrup of, for example, polymer-in-monomer solution is well known and can be prepared by the usual methods. For example, the syrup can be made by heating a small amount of a polymerization initiator in a solution in the methacrylate ester, alone or in combination with another $\alpha,\beta$-ethylenically unsaturated compound, optionally in the presence of a chain transfer agent, at a suitable pressure and temperature. Heating is continued until the solution reaches a predetermined viscosity. Thereafter, the hot solution is cooled. More specifically, a syrup having a viscosity of 0.5-100 poises at 25° C. can be produced from methyl methacrylate by heating the monomeric methyl methacrylate in a jacketed kettle at a temperature of 50°-150° C. under refluxing conditions. Normally, atmospheric pressure is used, and the refluxing material is stirred. The heating is conducted in the presence of a small amount of initiator. When the desired viscosity is attained, the polymerization is stopped by cooling the mixture by any conventional means. One method involves adding 1–10% by weight of cold methyl methacrylate containing sufficient hydroquinone or other polymerization inhibitor to inhibit further polymerization of the methyl methacrylate.

The prepoly syrup solution usually contains about from 10 to 40% by weight of the methyl methacrylate polymer dissolved in the methyl methacrylate monomer. The polymer ordinarily has an inherent viscosity of about from 0.35 to 1.0 determined at 20° C. causing a solution of 0.50 gram of the polymer per 100 milliliters of methylene chloride. The polymer can also be a copolymer involving a major portion, that is, at least about 50%, of the methyl methacrylate monomer with such monomers as vinyl acetate, styrene, methyl acrylate, ethyl acrylate, butyl acrylate, cyclohexyl acrylate, 2-ethylhexyl acrylate, acrylonitrile, ethyl methacrylate, butyl methacrylate, cyclohexyl methacrylate, 2-ethylhexyl methacrylate and methacrylonitrile.

The prepoly syrup is used to prepare cast methyl methacrylate articles, such as sheets, by either cell or continuous processes. For casting, temperatures of about from 45° C. to 90° C. are usually employed, and for post curing, temperatures of about from 110° C. to 140° C. are used. Pressure employed during casting is usually autogenous pressure.

The three peroxide initiators used to polymerize the syrup are selected based upon their half-life or decomposition properties. The half-life of each peroxide initiator is the time required for one-half of the peroxide moieties to decompose at a given temperature. The initiator mixture contains a first initiator and a second initiator, which, in combination, will polymerize the syrup from about 20% conversion to about 90% conversion during a first heating at about 45° C. and 90° C. The third peroxide initiator of the mixture will increase the conversion to at least about 97.5% polymer during a second heating of between about 110° C. to 140° C. during final cure.

The first initiator should be selected from those initiators with a half-life at 85° C. of about from 2 to 8 minutes and which emit a maximum of 1 mole of carbon dioxide gas per 2 moles of free radicals generated. Initiators which have the foregoing characteristics and which will achieve the necessary polymerization rate include, for example, peroxyesters such as α-cumyl peroxyneodecanoate, t-amyl peroxyneodecanoate, and t-butyl peroxyneodecanoate. The amyl and butyl peroxyneodecanoates are preferred. The first initiator should be present in a quantity of about from 0.3 to 16 moles per 1 million grams of syrup.

The second initiator should exhibit a half-life at 85° C. of about from 10 to 25 minutes and emit a maximum of 1 mole of carbon dioxide per 2 moles of free radicals generated. Such compounds include, for example, peroxyesters such as t-amyl peroxypivalate and t-butyl peroxypivalate. The second initiator should also be present in a concentration to provide from about 0.3 to 16 moles per million grams of syrup.

The third initiator used in the present invention is present in a concentration which provides about from 0.1 to 6.0 moles per million grams of syrup. It has a half-life at 110° C. of about from 1.0 to 3.5 minutes and emits a maximum of 1 mole carbon dioxide for each mole of free radical generated. Compounds which can be used as the third initiator include, for example, diisononoyl, dilauroyl or didecanoyl peroxide and 2,5-dimethyl-2,5-bis(2-ethylhexoyl peroxy)hexane. Didecanoyl and the lattermost compound are preferred.

A solution of the three initiators can be prepared by simple admixture or by addition of the initiators to acrylate or methacrylate monomer. The prepoly syrup is prepared by mixing the initiator solution and comonomer, chain transfer agent, crosslinking agent, pigment, and any other desired additives. The initial polymerization can be carried out at temperatures of about from 45° C. to 95° C. Temperatures of about from 55° C. to 90° C. are preferred to maximize the polymerization rate. This can be done in a heated water bath. The optimum polymerization temperature and initiator concentration depend upon sheet thickness, since thick sheet is more prone to bubble formation during polymerization. This occurs because of the poor heat transfer of the heat of reaction from the sheet to the water bath due to the low thermal conductivity of the acrylic polymers. In order to minimize bubble formation in thick sheet, the polymer temperature should therefore not exceed about 105° C. while in the water bath. After the sheet is taken from the 55° C. to 90° C. water bath, it is heated to a temperature of about from 110° C. to 140° C. in, for example, a glycol bath or an infrared oven. The sheet is then cooled to about 90° C. The sheet is above 110° C. for about from 5 to 60 minutes. The time is dependent upon sheet thickness. The third initiator is consumed by the time the sheet is cooled to 90° C.

The exact concentrations of each initiator used in the present invention will depend upon factors including sheet thickness, and any chain transfer agent, crosslinking agent, pigment and comonomer present. Thicker sheet, for example, will use concentrations toward the lower end of the indicated ranges while thinner sheet will require concentrations toward the middle and upper end of the range.

For thermoformable sheets, chain transfer agents and crosslinking agents are generally used. The chain transfer agent can be a mercaptan, e.g., alkyl mercaptans of up to 20 carbon atoms, especially n-alkyl mercaptans of between about 4 and 20 carbon atoms, or aryl mercaptans in which the aryl group can be phenyl or naphthalyl and which can contain alkyl (of 1–12 carbon atoms) or halogen (Cl, Br, I) substituents; polyhaloalkanes (preferably of 1–5 carbon atoms); phosphines such as $R_2PH$ or $RPH_2$ wherein R is aryl of 6–10 carbon atoms, or alkyl of 1–10 carbon atoms.

The crosslinking agent can be any organic compound that is copolymerizable with the methyl methacrylate monomer and which contains at least two ethylenically unsaturated double bonds, e.g., a diacrylate or dimethylacrylate, such as the alkylene or hydroxy substituted alkylene diacrylates or dimethacrylate, e.g., 1,2-ethylene dimethacrylate or 1,6-hexanediol dimethylacrylate.

In addition, conventional UV stabilizers, thermal stabilizers, polymerization inhibitors, dyes and pigments can be added in conventional quantities.

Acrylic sheet produced with the ternary peroxide initiator systems in the process of the present invention has a higher thermal stability and is less prone to bubble formation than sheet produced with processes using peroxide/azo or dual azo initiators. This is due to the decomposition characteristics of the initiators selected. When peroxides decompose during polymerization, they emit carbon dioxide. Azo initiators emit nitrogen. Nitrogen is less soluble in acrylic sheet than carbon dioxide and will cause bubbles to form at lower concentrations than carbon dioxide. To minimize bubble formation, improve thermal stability and maintain a high production rate, peroxide initiators are selected with certain half-life and decomposition properties.

The present system also offers advantages over dual peroxide initiator systems. Specifically, a dual peroxide system has the deficiency that, as the peroxide concentrations are increased to increase polymerization rate, the thermal stability of the resulting polymer decreases. The polymers resulting from use of the present three initiator system are less sensitive to elevated temperatures. Specifically, with the present systems, the concentration of the second initiator can be increased to provide a higher rate of polymerization, but without higher thermal instability.

The initiator systems used in the present invention, through the selection of varying half-lives, provide initiator activity through the entire range of polymerization and curing. This results in both rapid polymerization and high thermal stability in the finished product which permits, for example, thermoforming at elevated temperatures without depreciation of the product characteristics.

Thermal stability can be measured by three different methods. In the first, the sheet is placed in an air circulating oven for 30 minutes at 180° C. In the second, the sheet is placed in the same type of oven for 90 minutes at 193° C. If the sheet is bubble free after removal from the oven, it passes these tests.

The third test is called an infrared (IR) bubble test in which a small piece of sheet with a thermolabel (a temperature sensitive tape which changes color when it is heated to its thermolabile temperature) attached is placed into an infrared oven which has a window. An operator watches the sheet as it heats and removes the sheet when bubbles begin to form. The temperature at which bubbles form is called the IR bubble temperature.

As is commonly known, acrylic polymers have an affinity for water. Water can be adsorbed into the sheet from the surrounding air reaching concentrations as high as 2%. When acrylic polymer adsorbs water or water is added to the casting syrup, the thermal stability of acrylic sheet decreases sharply. If the polymer is dried, such as in an oven, then the thermal stability increases back to its original degree of stability.

The invention is further illustrated by the following examples, in which parts and percentages are by weight unless otherwise indicated.

EXAMPLE 1

Casting syrup was made using 172 grams of prepoly syrup, 10 grams of initiator solution, 10 grams of EDMA/LM solution and 8 grams of n-butyl acrylate.

The prepoly syrup was prepared according to the general procedures described in Novak, U.S. Pat. No. 4,328,329. It exhibited a viscosity of 1800 cp and contained 20–24 percent polymer.

Initiator solution was made up of 3.58 grams of t-butyl peroxyneodecanoate having a purity of 75%, 0.89 grams of didecanoyl peroxide and 0.93 grams of t-butyl peroxypivalate. In addition, the initiator solution contained 0.40 grams of Topanol A inhibitor (10% purity in MMA solution), 0.11 gram of Tinuvin P ultraviolet stabilizer, 0.08 grams of Aerosol OT mold release agent and 44.05 grams of uninhibited methyl methacrylate.

The EDMA/LM solution contained 7.0 grams of ethylene glycol dimethacrylate (EDMA) crosslinking agent, 4.0 grams of lauryl mercaptan chain transfer agent and 89.0 grams of methyl methacrylate.

The casting syrup was mixed for 30 minutes using a magnetic stirrer. It was then degassed for 15 minutes at 40 mm Hg absolute pressure while mixing. Vacuum was then released with argon gas. The casting syrup was poured into 3–125 mil stainless steel casting cells. The cells had polyvinyl chloride gasketing around the edges to prevent syrup from escaping. The cells were held together with clamps. In the middle of one cell, a thermocouple was placed to measure the sheet/syrup temperature. The thermocouple was held in place by a small piece of gasket in the middle of the sheet to be sure the thermocouple read the syrup temperature instead of the steel plate temperature. The three casting cells were placed in an 80° C. water bath. The Tromsdorff peak occurred after 15.5 minutes in the bath. The castings were taken out of the bath after 17 minutes and then placed in a 140° C. ethylene glycol bath for three minutes. Then the castings were removed from the glycol bath and allowed to cool by being exposed to room air. Once the sheets cooled to 90° C., they were quenched in cold water at 15°–25° C. The sheets were then removed from the casting cells. The sheet was evaluated for 90 minutes stability at 193° C. and the IR bubble was determined. The percent water content in the finished sheet was determined, as well as the residual methyl methacrylate and butyl acrylate monomer content. The finished sheet was examined for the formation of bubbles during polymerization inside of the edge of the finished sheet. The results of these evaluations are summarized in the Table.

EXAMPLES 2-7

In Examples 2-7, the general procedure of Example 1 was repeated, using the concentration of first and second initiators and water bath temperatures shown in the Table. The resulting products were similarly evaluated and the results indicated in that Table. In Example 2–7, the castings were taken out of the water bath 1.5 minutes after the peak temperature was reached.

EXAMPLE 8

In Example 8, the general procedure of Example 1 was repeated, except that 187 mil sheet was produced and 1% Cirulean Blue pigment was added to the casting syrup. The polymerization was carried out using two water baths set at different temperatures in order to avoid bubble formation. The casting cells were placed in an 84° C. bath for 5.5 minutes, and then placed in the 80° bath for the balance of the time (2.0 minutes after the peak). The resulting products were evaluated as before and the results summarized in the Table.

TABLE

| Example*** | PND* Concentration ($10^{-6}$ Moles/g) | BPP** Concentration ($10^{-6}$ Moles/g) | Bath Temp (°C.) | Peak Time (Min) | 193° C. 90 Min. Stability | I.R. Bubble Temp (°C.) | $H_2O$ (%) | Residual MMA (%) | Residual BA (%) | Bubbles During Polymerization |
|---|---|---|---|---|---|---|---|---|---|---|
| 1 | 11.0 | 4.0 | 80 | 15.5 | Fail | 210 | 0.20 | 0.82 | 0.05 | 0 |

TABLE-continued

| Example*** | PND* Concentration ($10^{-6}$ Moles/g) | BPP** Concentration ($10^{-6}$ Moles/g) | Bath Temp (°C.) | Peak Time (Min) | 193° C. 90 Min. Stability | I.R. Bubble Temp (°C.) | $H_2O$ (%) | Residual MMA (%) | Residual BA (%) | Bubbles During Polymerization |
|---|---|---|---|---|---|---|---|---|---|---|
| 2 | 3.0 | 5.0 | 80 | 26.0 | Pass | 232 | 0.12 | 1.15 | 0.09 | 0 |
| 3 | 7.0 | 8.0 | 80 | 17.2 | Fail | 206 | 0.29 | 0.99 | 0.07 | 0 |
| 4 | 3.0 | 5.0 | 85 | 21.2 | Pass | 228 | 0.28 | 1.05 | 0.11 | 0 |
| 5 | 3.0 | 12.0 | 85 | 14.3 | Pass | 216 | 0.46 | 1.39 | 0.21 | 0 |
| 6 | 3.0 | 12.0 | 90 | 12.0 | Fail | 212 | 0.14 | 1.35 | 0.14 | 4 |
| 7 | 7.0 | 8.0 | 90 | 11.2 | Fail | 209 | 0.28 | 0.95 | 0.08 | 2 |
| 8 | 3.0 | 12.0 | 84/80 | 14.7 | Pass | 217 | 0.13 | 1.26 | 0.34 | 0 |

*t-butyl peroxyneodecanoate
**t-butyl peroxypivalate
***All Examples has $2.60 \times 10^{-6}$ moles/g of didecanoyl

I claim:

1. In a process for preparing acrylic polymer sheet, said polymer selected from the group consisting of methyl methacrylate homopolymer, copolymers of methyl methacrylate with α,β-ethylenically unsaturated compounds and mixtures thereof, which process comprises polymerizing a syrup having a viscosity of 0.5–100 poises at 25° C. and containing about 10–40% by weight of methyl methacrylate homopolymer, copolymer of methyl methacrylate with α,β-ethylenically unsaturated compounds, said copolymer comprising a major portion of methyl methacrylate or mixtures thereof in monomeric methyl methacrylate in the presence of initiator, the improvement wherein the initiator comprises (a) about from 0.3 to 16 moles per one million grams of syrup of a first peroxide initiator which has a half-life at 85° C. of about from 2 to 6 minutes and which emits a maximum of 1 mole of carbon dioxide per 2 moles of free radical generated;

(b) about from 0.3 to 16.0 moles per one million grams of syrup of a second peroxide initiator which has a half-life at 85° C. of about from 10 to 25 minutes and which emits a maximum of 2 moles of carbon dioxide per 2 moles of free radicals generated; and (c) about from 0.1 to 6.0 moles per one million grams of syrup of a third peroxide initiator which has a half-life at 110° C. of about from 1.0 to 3.5 minutes and which emits a maximum of one mole of carbon dioxide for each mole of free radical generated;

the process further comprising first heating the mixture of the syrup and the initiator solution to a temperature of about from 45° to 90° C. for about from 10 to 100 minutes wherein about 90% polymerization occurs, and subsequently heating the mixture to a temperature of about from 110° C. to 140° C. wherein at least about 97.5% polymerization occurs.

2. A process of claim 1 wherein the first initiator is selected from the group consisting of t-amyl peroxyneodecanoate and t-butyl peroxyneodecanoate.

3. A process of claim 2 in which the first initiator is t-butyl peroxyneodecanoate.

4. A process of claim 1 wherein the second initiator is selected from t-amyl peroxypivalate and t-butyl peroxypivalate.

5. A process of claim 4 wherein the second initiator is t-butyl peroxypivalate.

6. A process of claim 1 wherein the third initiator is selected from the group consisting of diisononanoyl, dilauroyl or didecanoyl peroxide and 2,5-dimethyl 2,5-bis(2-ethyl hexoyl peroxy)hexane.

7. A process of claim 6 wherein the third initiator is didecanoyl peroxide.

8. A process of claim 6 wherein the third initiator is 2,5-bis(2-ethyl hexoyl peroxy)hexane.

* * * * *